Figure 1:
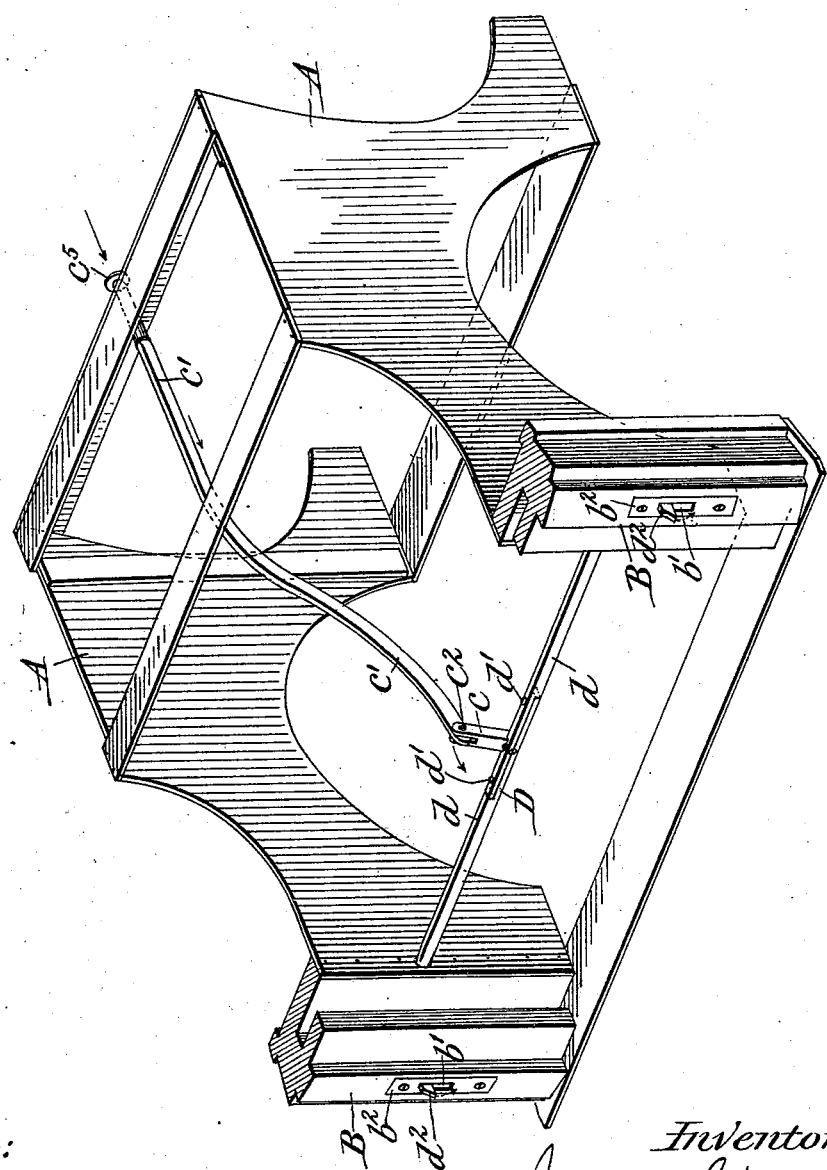

(No Model.) 2 Sheets—Sheet 1.

J. STIVERS.
FASTENER FOR VEHICLE DOORS.

No. 558,226. Patented Apr. 14, 1896.

Attest:
F. H. Schott
Henry D. Finckel

Inventor:
Jerome Stivers
by Grant Burroughs
atty.

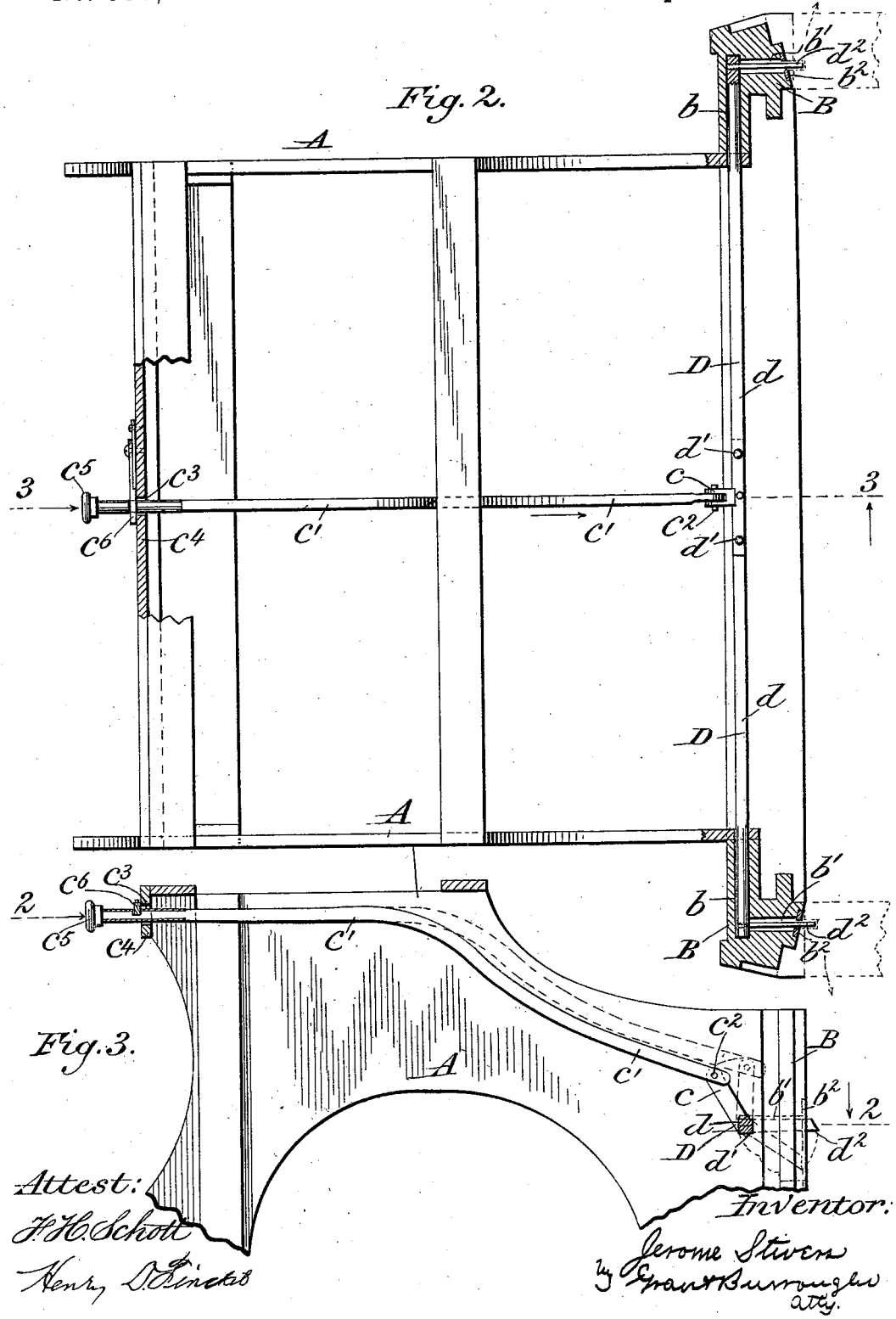

UNITED STATES PATENT OFFICE.

JEROME STIVERS, OF NEW ROCHELLE, NEW YORK, ASSIGNOR TO GEORGE E. W. STIVERS, OF NEW YORK, N. Y.

FASTENER FOR VEHICLE-DOORS.

SPECIFICATION forming part of Letters Patent No. 558,226, dated April 14, 1896.

Application filed January 23, 1896. Serial No. 576,577. (No model.)

*To all whom it may concern:*

Be it known that I, JEROME STIVERS, a citizen of the United States, residing at New Rochelle, Westchester county, and State of New York, have invented certain new and useful Improvements in Locks or Fasteners for Vehicle-Doors, of which the following is a full, clear, and exact description, such as will enable those skilled in the art to which it appertains to make and use the same, reference being had to the accompanying drawings.

The invention relates to improvements in locks or fasteners of that class which are adapted to be used in securing the doors of vehicles.

It has for its object the provision of a device whereby the lock or fastener of a vehicle-door can be controlled from the driver's seat, thereby preventing the opening of the door without the driver's knowledge or consent.

While the invention can be applied to a vehicle of almost any description provided with a door or doors, it is particularly adapted to be used in closed carriages. It will therefore be described and illustrated as applied to the latter class of vehicles.

The invention consists in the novel construction, combination, and arrangement of parts, such as will be hereinafter fully described, pointed out in the appended claims, and illustrated in the accompanying drawings.

In the accompanying drawings, in which similar letters of reference designate corresponding parts, Figure 1 is a detail perspective view showing the skeleton of the driver's seat, sections of the side jambs of the doorways, and the locking or fastening mechanism applied thereto. Fig. 2 is an enlarged detail view showing a section on the line 2 2 of Fig. 3. Fig. 3 is a similar view showing a section on the line 3 3 of Fig. 2.

Referring to the drawings by letter, A A designate the side pieces of the driver's box, and B B the front jambs of the doorways on opposite sides of the vehicle. The foregoing may be of any construction suitable in the premises. Transversely through the jambs B B the holes $b\ b$ are formed. These holes register at their inner ends with the recesses $b'\ b'$, formed in the faces of the jambs. In the holes $b\ b$ are journaled the ends of the rotatable rod D, which extends transversely through the vehicle in such a position as to be suitably inclosed by the sheathing. This rod is made in two parts $d\ d$, joined at their inner ends by the rivets $d'\ d'$ or in any other suitable manner. The rod is made in two parts, so that it can be readily inserted in the holes $b\ b$ in the jambs and also that it may be made to fit a vehicle of any width. On the ends of the rod are mounted the catches $d^2\ d^2$, which move in the recesses $b'\ b'$, formed in the faces of the jambs B B, and which are adapted to engage with suitable recesses formed in the doors for their reception when the latter are closed. The recesses are guarded by the usual plates $b^2\ b^2$. The catches are secured to the ends of the rod D by having their ends, which are screw-threaded, turned into suitably screw-threaded openings formed in the ends of the said rod.

Attached to the rod D, intermediate of its ends, is a crank-arm $c$. To the free end of this crank-arm is hinged the inner end of the rod $c'$ by the pintle $c^2$. The rod $c'$ passes forward beneath the driver's seat through the opening $c^3$ in the cross-piece $c^4$. Its projecting end is provided with a knob $c^5$. Where the rod $c'$ passes through the opening $c^3$ it is covered with rubber or other suitable material to prevent rattling. A catch $c^6$ is provided, so that the rod $c'$ can be secured in any position that it might be adjusted to.

The operation of the device is as follows: Assuming that the doors of the vehicle are closed, the driver from his position on the seat draws the rod $c'$ forward. Through the intermediate mechanism, consisting of the crank-arm $c^3$ and the rotatable rod D, the catches $d^2\ d^2$ are turned to register with the recesses formed in the doors for their reception. By means of the catch $c^6$ the rod $c'$ is held against accidental movement. When it is desired to unlock the door, the process is reversed.

If it is desired, a means may be provided whereby the catches can be turned from the inside of the carriage independent of the driver's action, which means may be concealed or operated in the manner of a permutation-lock, so that the lock can be operated by some one inside acquainted with the combination or has a key.

It is obvious that the invention can be applied to doors other than those of vehicles without departing from the spirit of the same.

Having thus described my invention, what I claim, and desire to secure by Letters Patent, is—

1. In a lock for vehicle-doors, the combination of the jambs, the rod journaled therein, the catches mounted on the ends of the said rod, the crank-arm attached to the said rod intermediate of its ends, and the operating-rod hinged to the said crank-arm, substantially as described.

2. In a lock for vehicle-doors, the combination of the jambs, the rod journaled therein, the catches mounted on the ends of the said rod, the crank-arm attached to the said rod, the operating-rod hinged to the crank-arm and leading to the driver's seat, and the catch adapted to engage with the said operating-rod, substantially as described.

In testimony whereof I hereunto affix my signature in the presence of two witnesses.

JEROME STIVERS.

Witnesses:
W. H. WITHERSPOON,
FRED. HOUSCHILD.